(12) United States Patent
Zhang et al.

(10) Patent No.: US 8,958,166 B2
(45) Date of Patent: Feb. 17, 2015

(54) METHOD AND SYSTEM FOR SLIDING-WINDOW BASED PHASE, GAIN, FREQUENCY AND DC OFFSET ESTIMATION FOR SERVO CHANNEL

(71) Applicant: LSI Corporation, San Jose, CA (US)

(72) Inventors: Xun Zhang, Westford, MA (US); Mark D. Thornley, Fort Collins, CO (US); Dahua Qin, Allentown, PA (US); Haitao Xia, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/895,809

(22) Filed: May 16, 2013

(65) Prior Publication Data

US 2014/0340780 A1 Nov. 20, 2014

Related U.S. Application Data

(60) Provisional application No. 61/823,880, filed on May 15, 2013.

(51) Int. Cl.
| | |
|---|---|
| *G11B 20/10* | (2006.01) |
| *G11B 5/09* | (2006.01) |
| *G11B 21/02* | (2006.01) |
| *G11B 20/16* | (2006.01) |
| *G11B 5/012* | (2006.01) |

(52) U.S. Cl.
CPC ............... *G11B 20/16* (2013.01); *G11B 5/012* (2013.01)
USPC .................................. 360/39; 360/46; 360/75

(58) Field of Classification Search
None
See application file for complete search history.

(56) References Cited

U.S. PATENT DOCUMENTS

| | | | |
|---|---|---|---|
| 7,012,881 B2 | 3/2006 | Kim | |
| 7,809,097 B2 | 10/2010 | Wang et al. | |
| 7,889,803 B2 | 2/2011 | Gu et al. | |
| 2012/0182643 A1* | 7/2012 | Zhang et al. | ............... 360/77.02 |

* cited by examiner

*Primary Examiner* — Regina N Holder
(74) *Attorney, Agent, or Firm* — Suiter Swantz pc llo (57) ABSTRACT

Sliding-window based data processing includes receiving an analog signal, converting the analog signal to a series of digital samples synchronous to a sampling clock, performing a first discrete Fourier transform on a first portion of the series of digital samples, performing a second discrete Fourier transform on a second portion of the series of digital samples, performing a third discrete Fourier transform on a third portion of the series of digital samples, generating a first series of zero phase start values by calculating a zero phase start value based on the first discrete Fourier transform in a sliding-window at a series of time increments across the servo preamble, storing the zero phase start values, and averaging the stored zero phase start values at the end of the servo preamble.

22 Claims, 6 Drawing Sheets

METHOD AND SYSTEM FOR SLIDING-WINDOW BASED PHASE, GAIN, FREQUENCY AND DC OFFSET ESTIMATION FOR SERVO CHANNEL

CROSS-REFERENCE TO RELATED APPLICATIONS

The present application claims the benefit under 35 U.S.C. §119(e) of U.S. Provisional Application Ser. No. 61/823,880, filed May 15, 2013, which is incorporated herein by reference in its entirety.

FIELD OF INVENTION

The present invention generally relates to digital signal processing.

BACKGROUND

Information storage devices commonly implement a magnetic storage medium suitable for storing information that is magnetically represented on the storage medium. For instance, a read head disposed in proximity to the storage medium senses the magnetically represented information and provides an electrical signal corresponding to the magnetically represented information. This electrical signal is transmitted to a data detection circuit that performs one or more data detection processes in order to recover the information originally written to the storage medium. Due to the short length of servo wedges, the timing, gain and DC recovery is typically carried out on the preamble only. Typically, the estimate of phase, gain and DC error four multiples of the channel bit duration, with the update applied to the clock generator and gain circuit in real-time. Commonly implemented schemes require real-time interaction between digital and analog circuits, which lead to propagation delay of the signal path. Further, typical systems fail to make use of the preamble that exists after a discrete Fourier transform (DFT) integration window drops, as a result of gate placement variation from wedge-to-wedge. Therefore, it is desirable to provide a method and system suitable for curing the defects of prior art data processing systems.

Therefore, it is desirable to provide a method and system suitable for mitigating the impact of the channel loss that occurs along the communications channel

SUMMARY

A method for data processing in a servo channel is disclosed. In one embodiment, one or more analog signals are received, wherein the one or more analog signals include a repeating signal. In another embodiment, the one or more analog signals are converted to a series of digital samples synchronous to a sampling clock. In another embodiment, a first discrete Fourier transform is performed on a first portion of the series of digital samples. In another embodiment, a second discrete Fourier transform is performed on a second portion of the series of digital samples. In another embodiment, a third discrete Fourier transform is performed on a third portion of the series of digital samples. In another embodiment, a first series of zero phase start values are generated by calculating a zero phase start value based on the first discrete Fourier transform in a sliding-window at a series of time increments across the servo preamble. In another embodiment, the first series of zero phase start values are stored for each of the time increments. In another embodiment, the first series of stored zero phase start values are averaged at the end of the servo preamble.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention. Reference will now be made in detail to the subject matter disclosed, which is illustrated in the accompanying drawings.

In some embodiments of the present invention, zero phase start (ZPS), zero gain start (ZGS), zero offset start (ZOS) and ZPS based frequency estimation is carried out over sliding-windows (e.g., discrete Fourier transform sliding windows) on a servo preamble. In additional embodiments, the estimation results from each sliding window are averaged in order to determine final phase, gain and DC estimates for the servo loop update. The sliding-window approach disclosed herein does not require real-time analog circuit updates and, therefore, does not suffer from signal path propagation delay. In some embodiments, the sliding-window approach described herein utilize the SAM_FND signal to identify the end of the servo preamble, thereby minimizing performance degradation due to misdetection of the servo preamble.

Figure 1A:
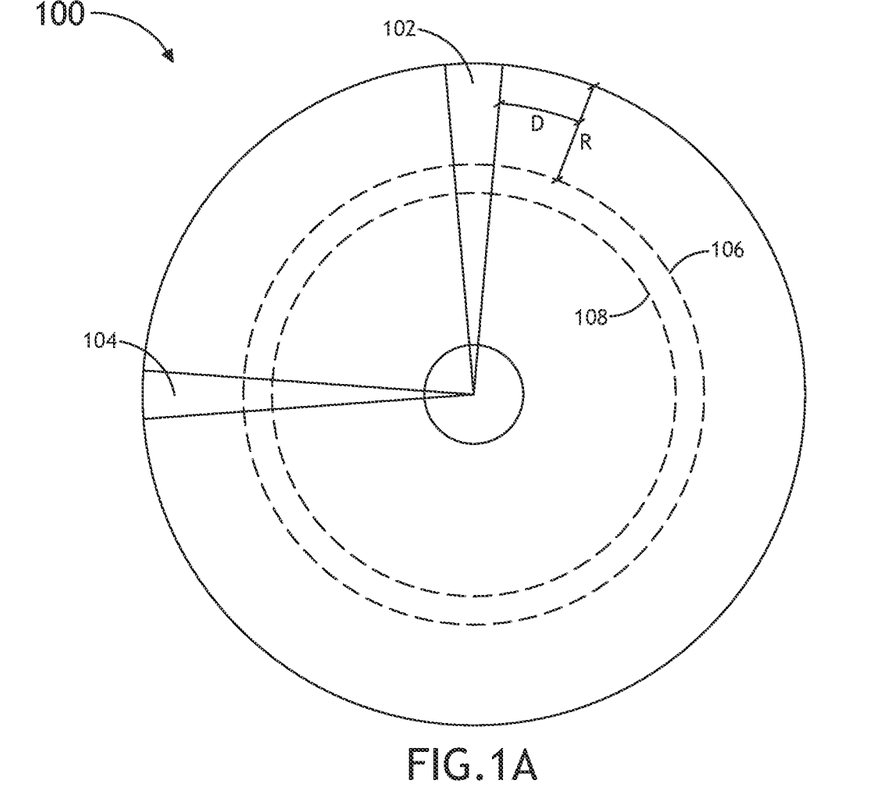
FIG. 1A illustrates a magnetic information storage medium, in accordance with one embodiment of the present invention.
Figure 1B:
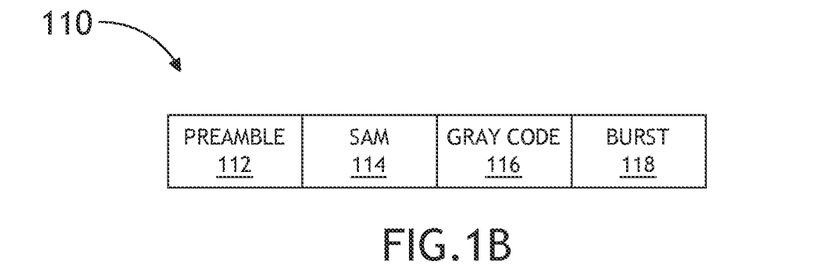
FIG. 1B illustrates a block diagram view of storage data stored in a magnetic information storage medium, in accordance with an embodiment of the present invention.
Figure 1C:
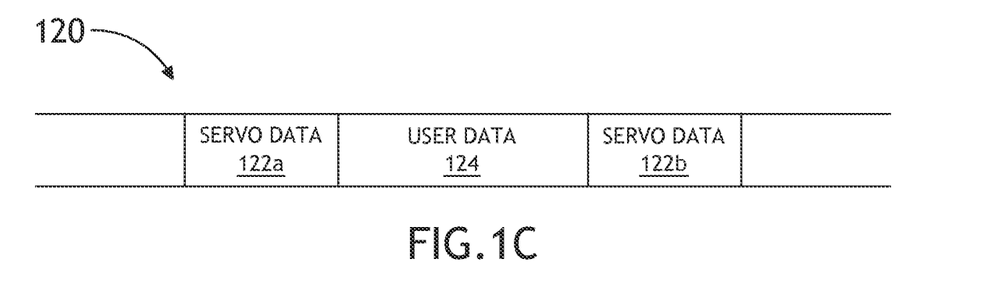
FIG. 1C illustrates a block diagram view of servo data and user data stored in the magnetic information storage medium, in accordance with an embodiment of the present invention.

FIGS. 1A-1C illustrate a storage medium 100, in accordance with one embodiment of the present invention. In one embodiment, the storage medium 100 includes two tracks 106, 108 indicated as dashed lines. In another embodiment, the tracks 106, 108 are segregated by servo data written within wedges 102, 104. In another embodiment, the servo wedges 102, 104 include servo data 110 utilized for control and synchronization of a read/write head assembly (not shown) over a desired location on the storage medium 100. In another embodiment, the servo data 110 includes a preamble pattern 112, which is followed by a sector address mark (SAM) 114. In another embodiment, the sector address mark 114 is followed by Gray code 116. In another embodiment, the Gray code 116 is followed by burst information 118. It is noted herein that the embodiments of the present invention are not limited to the number of tracks and wedges depicted in FIG. 1A since a given storage medium may include hundreds of tracks and wedges. In another embodiment, it is further noted herein that the servo data 110 may include multiple fields of burst information 118. In another embodiment, different types of information are stored in the servo fields. In one embodiment, repeatable run-out information appearing after burst information 14 is stored in the servo fields. In another embodiment, a user data region 124 is located between the servo data bit patterns 122a and 122b.

In one embodiment, in order write and read data to and from storage medium 100, the storage medium 100 is rotated relative to a sensor (not shown) configured to sense magnetically stored information from the storage medium 100. In another embodiment, in a read operation, the sensor senses servo data from wedge 104 (i.e., during a servo data period), user data from a user data region (e.g., 124) located between wedge 104 and wedge 102 (i.e., during a user data period) and additional servo data from wedge 102. In another embodiment, in a write operation, the sensor senses servo data from wedge 104 and then writes data to the user data region (e.g., 124) between wedge 104 and wedge 102. In another embodiment, the sensor is switched to sense a remaining portion of the user data region followed by the servo data from wedge 102.

Figure 2A:
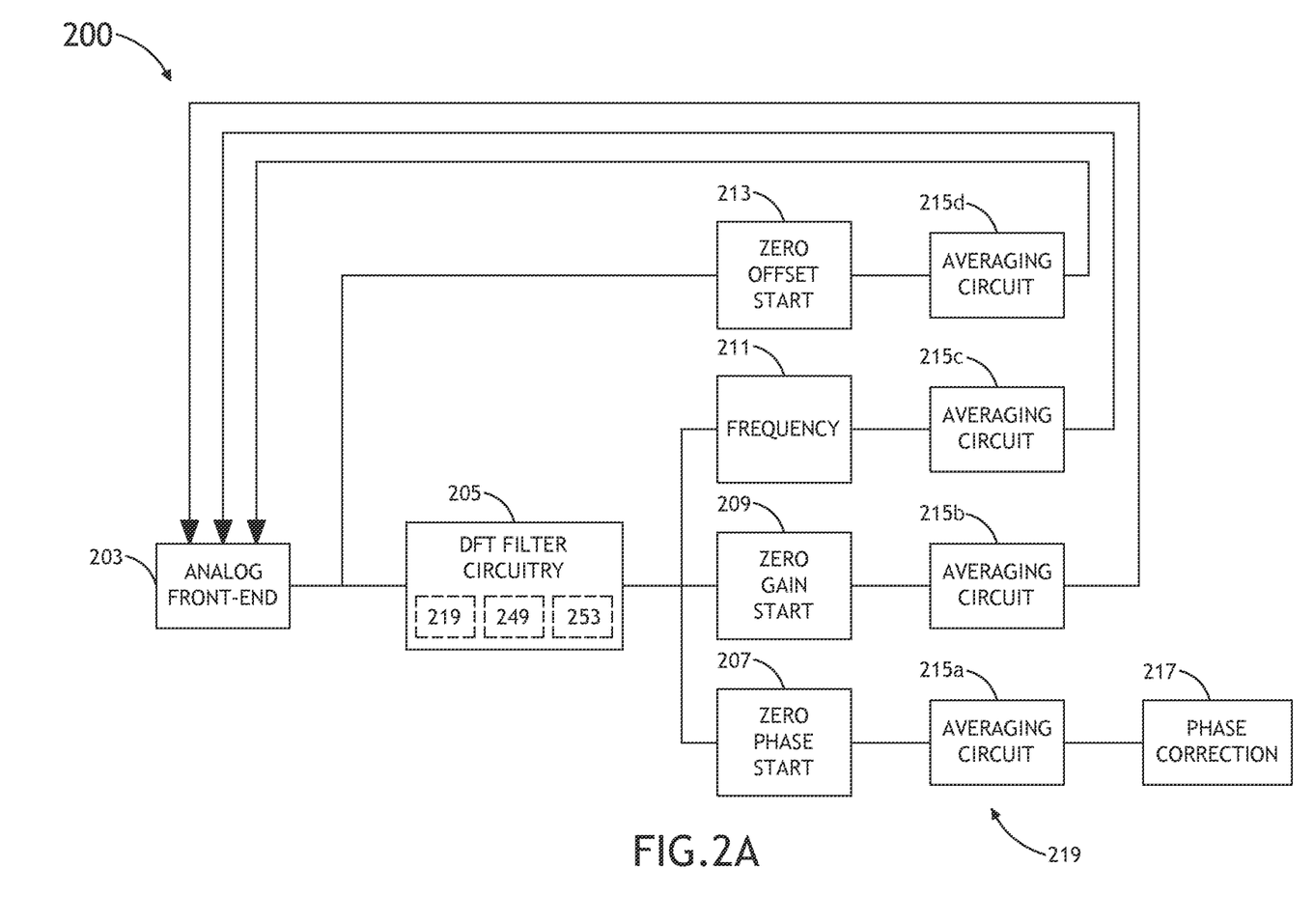
FIG. 2A illustrates a conceptual view of a data processing system equipped for sliding-window based estimation and averaging, in accordance with an embodiment of the present invention.

FIG. 2A illustrates a conceptual view of a data processing system 200 equipped for sliding-window based estimation and averaging, in accordance with an embodiment of the present invention.

In one embodiment, the system 200 includes an analog front-end (AFE) circuit 203 configured to receive one or more analog signals and then convert the one or more analog signals to a series of digital samples. In one embodiment, the received analog signal includes an analog signal derived by sensing information stored on a storage medium (e.g., medium 100).

Figure 2B:
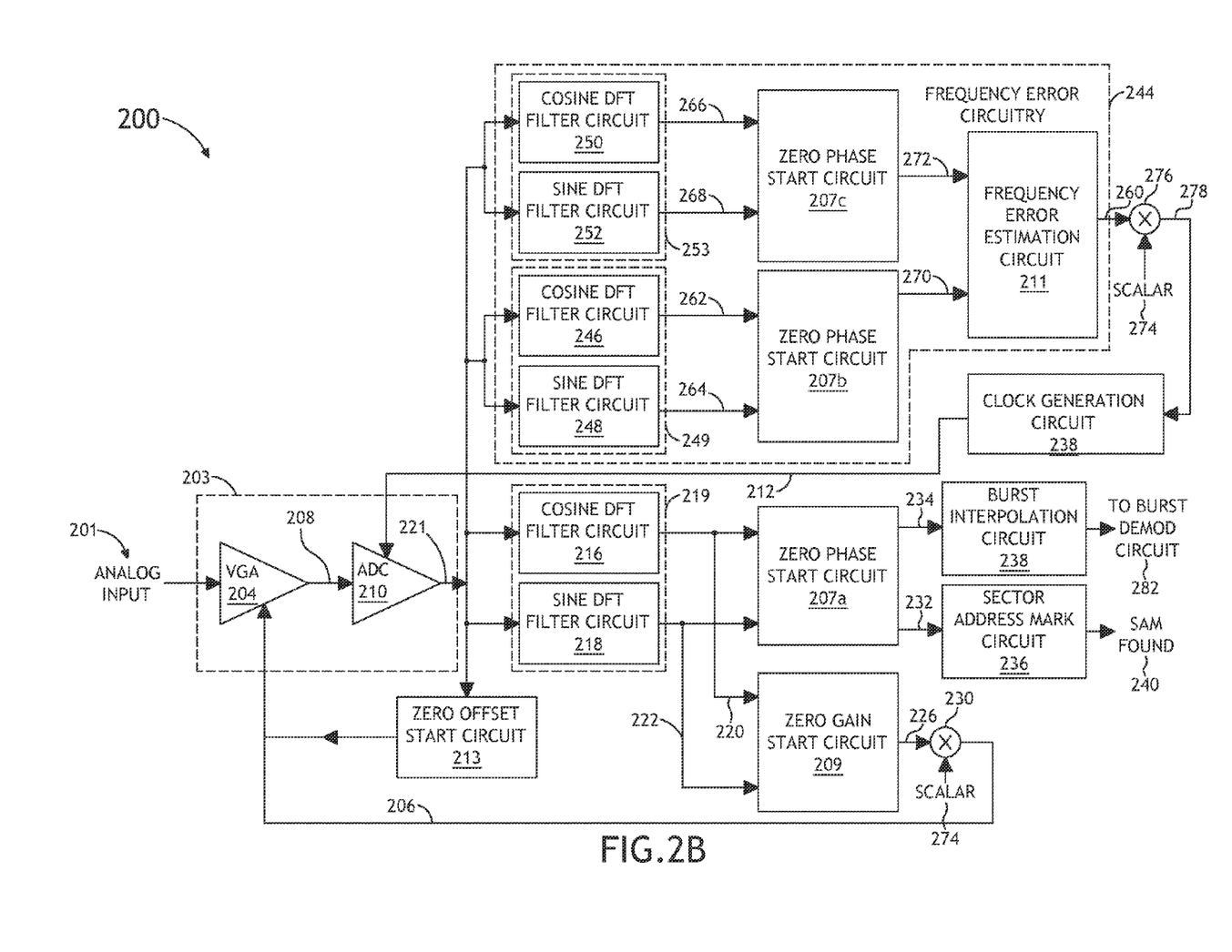
FIG. 2B illustrates a data processing system 200, in accordance with an embodiment of present invention.

In another embodiment, the analog front-end circuit 203 of system 200 includes a variable gain amplifier (VGA) configured to supply variable gain amplification to the received analog signal (see VGA 204 of FIG. 2B). In another embodiment, the gain applied to the amplification via the VGA of the front-end circuit is based upon a received gain feedback. It is noted herein that any known device for providing variable gain amplification is suitable for implementation in the embodiments of the present invention.

In another embodiment, the amplified output of the VGA of the front-end circuit 203 is supplied to an analog-to-digital converter (ADC) circuit (see ADC 210 of FIG. 2B). In another embodiment, the ADC circuit of the front-end circuit 203 converts the received amplified signal to a series of digital samples. In another embodiment, the series of digital samples output from the ADC circuit of the front-end circuit 203 possess a phase and frequency controlled by a sampling clock (see 212 of FIG. 2A). It is noted herein that any known device for providing analog-to-digital conversion is suitable for implementation in the embodiments of the present invention.

In one embodiment, the system 200 includes one or more discrete Fourier transform circuits 205. In another embodiment, the one or more discrete Fourier transform circuits 205 include a first discrete Fourier transform circuit 219, a second discrete Fourier transform circuit 249 and a third discrete Fourier transform circuit 253. As will be discussed in greater detail further herein, each discrete Fourier transform circuit is suitable for generating a discrete Fourier transform cosine component and a discrete Fourier transform sine component.

In another embodiment, the one or more Fourier transform circuits 205 are configured to perform a first discrete Fourier transform on a first portion of the series of digital samples from the front-end circuitry 203. In another embodiment, the one or more Fourier transform circuits 205 are suitable for calculating a first sine component and a first cosine component from the first portion of the series of digital samples.

In another embodiment, the one or more Fourier transform circuits 205 are configured to perform a second discrete Fourier transform on a second portion of the series of digital samples from the front-end circuitry 203. In another embodiment, the one or more Fourier transform circuits 205 are suitable for calculating a second sine component and a second cosine component from the second portion of the series of digital samples.

In another embodiment, the one or more Fourier transform circuits 205 are configured to perform a third discrete Fourier transform on a third portion of the series of digital samples from the front-end circuitry 203. In another embodiment, the one or more Fourier transform circuits 205 are suitable for calculating a third sine component and a third cosine component from the third portion of the series of digital samples.

In one embodiment, the system 200 includes one or more zero phase start (ZPS) calculation circuits 207, one or more zero gain start (ZGS) circuits 209, one or more zero offset start (ZOS) circuits 213 and one or more frequency error calculation circuits 211.

In one embodiment, the system 200 includes averaging circuitry 219 for averaging the collected ZPS, ZGS, ZOS or frequency error values at the end of the servo preamble. In this regard, the system 200 is configured to collect values from the ZPS circuit 207, the ZGS circuit 209, the ZOS circuit 213 and the frequency error calculation circuit 211 at a series of time increments in a sliding-window (e.g., DFT sliding-window) across the servo preamble. In another embodiment, the system 200 collects these until the end of the servo preamble is reached. In an additional embodiment, the series of values collected from the ZPS circuit 207, the ZGS circuit 209, the ZOS circuit 213 or the frequency error calculation circuit 211 are averaged. The averaged ZPS, ZGS, ZOS and frequency error values are then used to calculate timing, gain and D.C. and frequency correction circuits.

In another embodiment, the averaging circuitry 219 includes a first averaging circuit 215a configured to average the first series of stored zero phase start values at the end of the servo preamble, a second averaging circuit 215b configured to average the series of zero gain start values at the end of the servo preamble, a third averaging circuit 215c configured to average the series of frequency error values at the end of the servo preamble, and a fourth averaging circuit 215d configured to average the series of zero offset start values at the end of the servo preamble.

In one embodiment, a zero phase start calculation circuit 207 is configured to generate a first series of zero phase start values by calculating a zero phase start value based on the first discrete Fourier transform (e.g., cosine and sine components) in a sliding-window at a series of time increments (e.g., 32T, 40T, 48T and 56T and so on) across the servo preamble. In another embodiment, the first series of zero phase start values are stored in a memory (not shown in FIG. 2A), such as an internal working register. In another embodiment, the first averaging circuit 215*a* retrieves the stored first series of zero phase start values and averages the values at the end of the servo preamble in order to generate an averaged first zero phase start value. In another embodiment, the averaged zero phase start values are output to a phase correction circuit 217, such as burst interpolation circuit 238, as shown in FIG. 2B.

In one embodiment, the system 200 converts a zero phase start value acquired from a first integration window at a first time increment in order to determine a best phase start (BPS) value. In another embodiment, the system 200 performs a sector address mark (SAM) detection process following acquisition of a zero phase start value from a first integration window at a first time increment. Those skilled in the art will recognize that the identified BPS value may be loaded into the system interpolators in order to initiate sector address mark detection.

In one embodiment, a frequency error calculation circuit 211 is configured to generate a series of frequency error values by calculating a frequency error value based on the second discrete Fourier transform and the third discrete Fourier transform in a sliding-window at the series of time increments across the servo preamble. In another embodiment, the calculated frequency error values are based on a second series of zero phase start values generated from the second discrete Fourier transform (e.g., second cosine component and second sine component of second portion of series of digital samples) and a third series of zero phase start values generated from the third discrete Fourier transform (e.g., third cosine component and third sine component of third portion of series of digital samples) at a series of time increments across a servo preamble.

In another embodiment, the series of frequency error values are stored in a memory (not shown in FIG. 2A), such as an internal working register. In another embodiment, the third averaging circuit 215*c* retrieves the stored series of frequency error values and averages the values at the end of the servo preamble in order to generate an averaged frequency error value.

In another embodiment, the averaged frequency error value output from averaging circuit 215*c* is scaled in order to generate a frequency offset output. In another embodiment, the sampling clock (not shown in FIG. 2A) associated with the front-end circuit 203 is adjusted in response to the scaled frequency offset output, thereby providing timing feedback to the front-end circuit 203.

In one embodiment, a zero gain start calculation circuit 209 is configured generate a series of zero gain start values based on the first discrete Fourier transform in a sliding-window at the series of time increments across the servo preamble. In another embodiment, the zero gain start values are stored in memory (not shown in FIG. 2A), such as an internal working register. In another embodiment, the second averaging circuit 215*b* retrieves the stored the zero gain start values and averages the values at the end of the servo preamble in order to generate an averaged zero gain start value.

In another embodiment, the averaged zero gain start value output from the second averaging circuit 215*b* is scaled in order to generate a variable gain feedback value. In another embodiment, the generated variable gain feedback value is utilized to adjust the variable gain amplifier of the front-end circuit 203, thereby allowing feedback control of the gain of one or more analog signals being converted to the series of digital samples.

In another embodiment, a zero offset start calculation circuit 213 is configured to generate a series of zero offset start values based on an output of the analog front-end circuit in a sliding-window at the series of time increments across the servo preamble. In this regard, the zero offset start circuit 213 is placed in parallel with the DFT circuitry 205 and acts to carry out zero offset start calculations in parallel with the DFT calculations described above. It is further noted herein that the zero offset start calculations do not require the transformations carrier out by the transformation circuitry 205 described above, but rather the zero offset start circuitry averages all of the samples inside the DFT window.

In another embodiment, the zero offset start values are stored in memory (not shown in FIG. 2A), such as an internal working register. In another embodiment, the fourth averaging circuit 215*d* retrieves the stored the zero offset start values and averages the values at the end of the servo preamble in order to generate an averaged zero offset start value. In another embodiment, the averaged zero offset start value output from the fourth averaging circuit 215*d* acts to set a D.C. offset of the analog front-end circuitry 203.

In another embodiment, the system 200 identifies the end of the servo preamble with a sector address mark. In another embodiment, the system 200 identifies the end of the servo preamble using a SAM_FND signal.

In another embodiment, the ZPS, ZGS, ZOS and frequency error calculations are each accumulated sequentially as they become available. It is recognized herein that by accumulating the calculations as they become available the averaged result may be determined immediately upon receiving the last valid value for a given calculation simply by dividing by the number of accumulated results. It is further recognized herein that such an accumulation scheme may aid in reducing system latency.

In another embodiment, prior to accumulation, the values associated with each of the ZPS, ZGS, ZOS and frequency error calculations are pipelined using a FIFO. In another embodiment, a separate FIFO is utilized for each set of calculations. In one embodiment, a first FIFO is used to pipeline the series of first zero phase start values. In another embodiment, a second FIFO is used to pipeline the series of frequency error values. In another embodiment, a third FIFO is used to pipeline the series of zero gain start values. In another embodiment, a fourth FIFO is used to pipeline the series of zero offset start values.

FIG. 2B illustrates a data processing system 200, in accordance with an embodiment of present invention. In one embodiment, the sliding-window based averaging described throughout the present disclosure is applied in the context of the data processing architecture depicted in FIG. 2B. In this regard, the first averaging circuit 115*a*, the second averaging circuit 115*b*, the third averaging circuit 115*c* and the fourth averaging circuit 115*d* may collect results from the ZPS circuit 207*a*, the ZGS circuit 209, the ZPS based frequency error circuit 211 and the ZOS circuit 213 respectively and output averages for each estimate calculation. The following description of FIG. 2B should be interpreted as a description of a single collection iteration from the ZPS circuit 207*a*, the ZGS circuit 209, the ZPS based frequency error circuit 211 and/or the ZOS circuit 213. In another embodiment, it is noted that the steps described with respect to FIG. 2B may be in all or in part repeated, thereby collecting additional results for each of the ZPS, ZGS, frequency error and ZOS circuits, allowing for the averaging described throughout the present disclosure. As such, while the averaging circuits 215a-215d are not explicitly depicted in FIG. 2B it is recognized herein that the outputs for the ZPS circuit 207a, the ZGS circuit 209, the ZPS based frequency error circuit 211 and the ZOS circuit 213 each feed into one or more averaging circuits, such as those described throughout the present disclosure.

In one embodiment, the data processing circuit 200 includes an analog front-end circuit 203. In another embodiment, the analog front-end circuit 203 includes a variable gain amplifier (VGA) circuit 204 suitable for amplifying a signal received as an analog input 201 by a gain controlled by a variable gain feedback value 206. In another embodiment, the VGA circuit 204 includes any circuit known in the art that is capable of applying a variable gain to a received input. In another embodiment, the VGA circuit 204 provides the amplified signal as an amplified output 208. In another embodiment, the amplified output 208 is provided to an analog-to-digital converter (ADC) circuit 210 where it is sampled at a phase and frequency controlled by a sampling clock 212 to yield a series of digital samples 221.

In one embodiment, the digital samples 221 are provided to a first DFT circuit 219. In another embodiment, the first DFT circuit includes a cosine discrete Fourier transform filter circuit 216 and a sine discrete Fourier transform filter circuit 218. In this regard, the digital samples 221 are provided to the cosine discrete Fourier transform filter circuit 216 and a sine discrete Fourier transform filter circuit 218. In one embodiment, the cosine discrete Fourier transform filter circuit 216 performs a discrete Fourier transform over digital samples 221 that correspond to a repeating pattern, such as a servo preamble pattern, in the signal received via analog input 201 to yield a cosine component output 220. In another embodiment, sine discrete Fourier transform filter circuit 218 performs a discrete Fourier transform over digital samples 221 corresponding to a repeating pattern in the signal received via analog input 201 to yield a sine component output 222.

In one embodiment, a zero gain start circuit 209 calculates a raw gain error value 226 utilizing the received both sine component output 222 and cosine component output 220. In another embodiment, the zero gain start circuit 209 calculates raw gain error value 226 by estimating the amplitude (A) of the repeating pattern according to the following relationship:

$$A = \sqrt{(\text{sine component})^2 + (\text{cosine component})^2}$$

In another embodiment, the estimated amplitude (A) is compared with a selected target level to yield a raw gain error value. In another embodiment, in order to mitigate noise impact, an averaged gain loop is implemented by applying an update gain, defined a scalar 274, to raw gain error value 226 before updating the gain to variable gain amplifier circuit 204.

In another embodiment, the raw gain error value 226 is provided (via averaging circuit 215b not shown in FIG. 2B) to a selective multiplier circuit 230 configured to selectively scale the raw gain error value 226 by a scalar 274 in cases where the magnitude of raw gain error value 226 exceeds a selected threshold value. In another embodiment, the output of selective multiplier circuit 230 is provided as a gain output 206 to VGA circuit 204. In another embodiment, the gain output 206 governs the amount of gain applied by variable gain amplifier circuit 204 to the signal received via analog input 201.

In another embodiment, a zero phase start circuit 207a is configured to find the best phase selection (BPS) utilizing the received cosine component output 220 and sine component output 222. In another embodiment, the best phase selection includes selecting a quadrant and selecting a fine phase. In another embodiment, the quadrant is estimated based on the sign of cosine component output 220 and sine component output 222, while the fine phase is derived from the following zero phase calculation:

$$\text{Phase} = a\tan\left(\frac{\text{cosine component}}{\text{sine component}}\right)$$

In another embodiment, the zero phase start circuit 207a provides the quadrant and fine phase information as a phase select output 232 (via averaging circuit 215a not shown in FIG. 2A) to sector address mark detection circuit 236. In another embodiment, the sector address mark detection circuit 236 is configured to process the received data in order to identify a sector address mark (e.g., SAM 308 in FIG. 3 below). In another embodiment, upon identifying a sector address mark a "SAM found" output 240 is asserted.

In another embodiment, an output 234 from zero phase start circuit 207a (via the averaging circuit 215a depicted in FIG. 2A) is provided to a burst interpolation circuit 238. In another embodiment, the averaged output 234 is used in conjunction with a rate selector input (not shown) to select inputs for a four tap interpolation filter implemented as part of burst interpolation circuit 238.

In one embodiment, the system 200 includes frequency error circuitry 244. In another embodiment, the frequency error circuitry 244 includes a second discrete Fourier transform circuit 249 and a third discrete Fourier transform circuit 253. In one embodiment, the second discrete Fourier transform circuit 249 includes a cosine discrete Fourier transform filter circuit 246 and a sine discrete Fourier transform filter circuit 248. In another embodiment, the third discrete Fourier transform circuit 253 includes a cosine discrete Fourier transform filter circuit 250 and a sine discrete Fourier transform filter circuit 252.

In another embodiment, the frequency error circuitry 244 includes a second zero phase start circuit 207b and a third zero phase start circuit 207c. In another embodiment, frequency error circuitry 244 includes a frequency error estimation circuit 211. In another embodiment, the frequency error estimation circuit 211 calculates a raw frequency error value 260 using two consecutive zero phase start values from the respective zero phase start circuits 207b, 207c.

In one embodiment, each of the cosine discrete Fourier transform filter circuits 246, 250 and sine discrete Fourier transform filter circuits 248, 252 receive digital samples 221. In another embodiment, the cosine discrete Fourier transform filter circuit 246 calculates a first cosine value for digital samples corresponding to a first window to yield a first cosine output 262, and sine discrete Fourier transform filter circuit 248 calculates a first sine value for digital samples corresponding to the second window to yield a first sine output 264. In another embodiment, cosine discrete Fourier transform filter circuit 250 calculates a first cosine value for digital samples corresponding to a second window to yield a second cosine output 266, and sine discrete Fourier transform filter circuit 252 calculates a second sine value for digital samples corresponding to the second window to yield a second sine output 268.

In another embodiment, a phase estimation corresponding to the first window and provided at output 270 is calculated by zero phase circuit 207b according to the following equation:

$$\theta_1 = a\tan\left(\frac{\text{first cosine output}}{\text{first sine output}}\right)$$

In another embodiment, a phase estimation corresponding to the second window and provided at output 272 is calculated by zero phase circuit 207c according to the following equation:

$$\theta_2 = a\tan\left(\frac{\text{second cosine output}}{\text{second sine output}}\right)$$

In another embodiment, phase output 270 and phase output 272 are provided to a frequency error estimation circuit 211 configured to calculate a frequency error and provides the calculated error as raw frequency error value 260 (via averaging circuit 215c in FIG. 2A) according to the following equation:

$$\text{error} = \frac{(\theta_2 - \theta_1) \times (\text{Sampling Period})/360}{\text{Sample Length}/2}$$

where the Sample Length is the total number of samples used to calculate phase outputs 270 and 272.

In another embodiment, the raw frequency error value 260 (via averaging circuit 215c) is provided to a selective multiplier circuit 276 that selectively scales raw frequency error value 260 by a scalar 274 in situations where the magnitude of the raw frequency error value 260 exceeds a selected threshold value. In another embodiment, the output of selective multiplier circuit 276 is provided as a frequency offset output 278 to a clock generation circuit 238.

In another embodiment, the clock generation circuit 238 modifies sampling clock 212 based on frequency offset output 278 and a reference clock input (not shown). In another embodiment, the clock generation circuit 238 includes any phase/frequency correction circuit known in the art suitable for adjusting a sampling clock based on an offset value.

In other embodiments, it is noted herein that cosine discrete Fourier transform filter circuits of system 200 may be implemented as a single cosine discrete Fourier transform filter circuit. In other embodiments, sine discrete Fourier transform filter circuits of system 200 may be implemented as a single sine discrete Fourier transform filter circuit. In other embodiments, the zero phase start circuits 207b and 207c may be implemented as a single zero phase start circuit. In other embodiments, the zero phase start circuitry of system 200 may provide the zero phase start calculation value used by combination best phase selection and zero phase start circuit 207a.

Figure 2C:
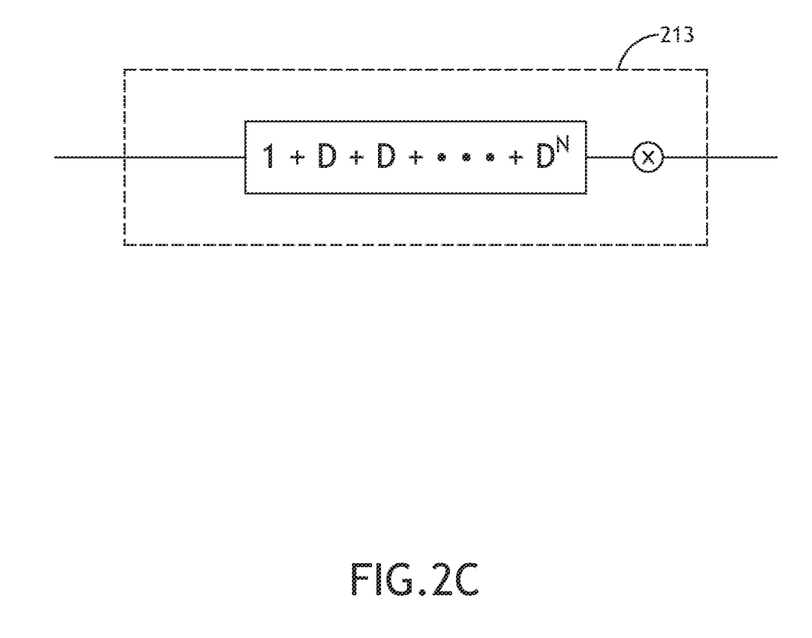
FIG. 2C illustrates a zero offset circuit 213 suitable for use in the data processing system 200, in accordance with an embodiment of the present invention.

In another embodiment, the data processing system 200 includes a zero offset start circuit 213. In one embodiment, the ZOS circuit 213 measures the output signal 221 from the ADC 210 in parallel with the first DFT circuit 219, the second DFT circuit 249 and the third DFT circuit 253. In another embodiment, the averaged zero offset start value is scaled in order to generate a D.C. offset. In another embodiment, the analog front-end 203 is adjusted in response to the generated D.C. offset. FIG. 2C illustrates a zero offset circuit 213 suitable for use in the data processing system 200, in accordance with an embodiment of the present invention.

Figure 3:
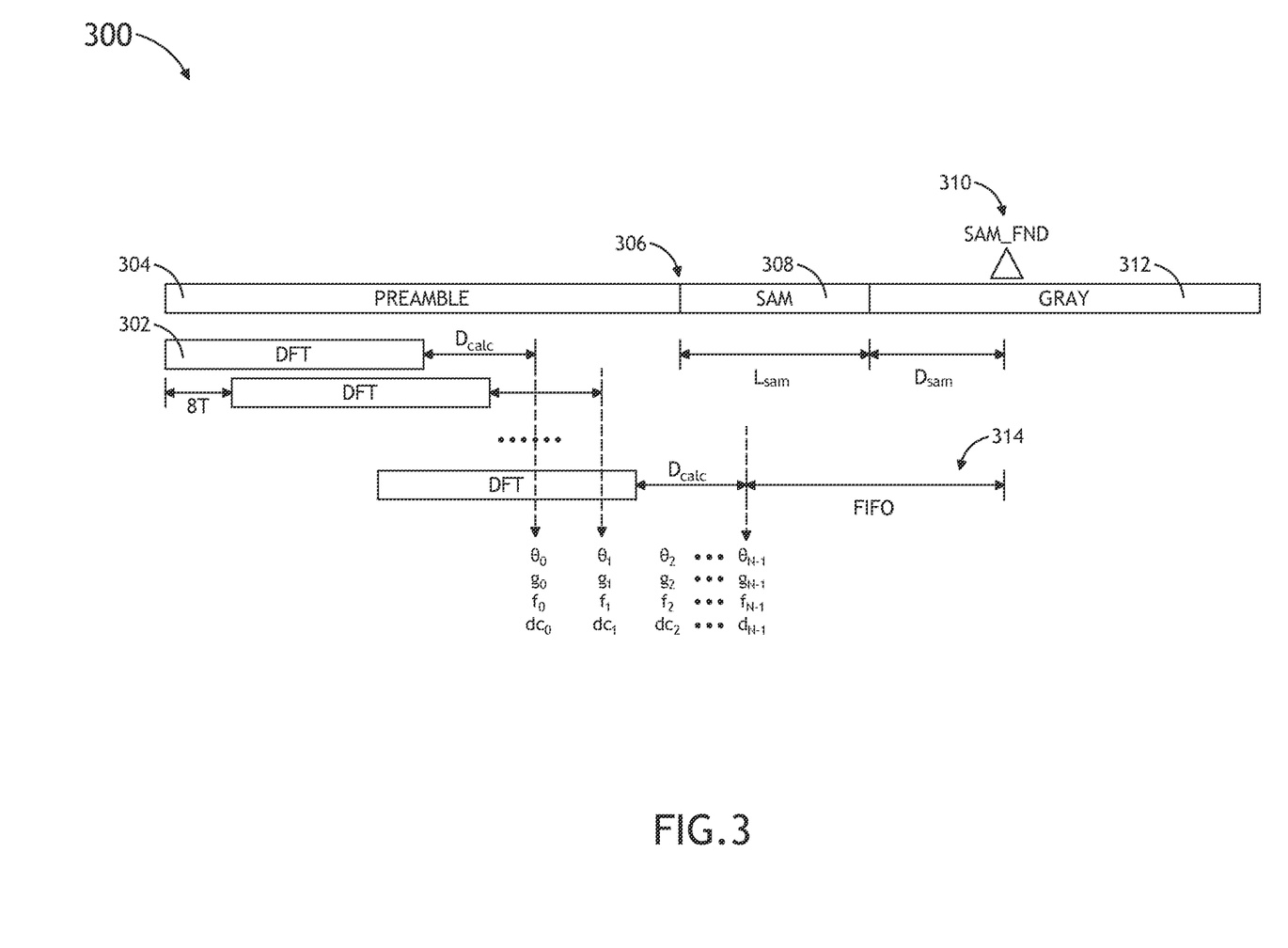
FIG. 3 illustrates a timing diagram associated with an example operation of a data processing circuit suitable for calculating ZPS, ZGS, ZOS and ZPS frequency estimates over DFT sliding windows, in accordance with one embodiment of the present invention.

FIG. 3 illustrates a timing diagram 300 associated with an example operation of data processing circuit 200 suitable for calculating ZPS, ZGS, ZOS and ZPS frequency estimates over DFT sliding windows (i.e., DFT sliding integration windows), in accordance with one embodiment of the present invention. In one embodiment, the DFT integration window 302 has a defined length (e.g., defined by ZPSLENS function). In another embodiment, at the end of the DFT integration window 302, ZPS, ZGS, ZOS or ZPS based frequency error estimations are calculated using procedures such as those described previously herein. In another embodiment, the results of the ZPS, ZGS, ZOS and ZPS based frequency error estimates are saved into memory, such as internal working registers. In another embodiment, the DFT sliding-window is moved by a time period. In one embodiment, the DFT sliding-window is moved by 8T, where T is the clock period of the servo baud rate. Upon moving the sliding-window by the selected time period, the system 200 then obtains another set of ZPS, ZGS, ZOS and ZPS based frequency error estimates. In another embodiment, the sliding-window is moved a number of times by a selected period (e.g., 8T), with new estimates obtained at each step, until the end 306 of the servo preamble 304 is reached.

In another embodiment, the ZPS calculated from the first DFT integration window 302 is converted to a best phase start (BPS). In another embodiment, the converted BPS is loaded into the system 200 interpolators to initiate sector address mark 308 detection.

In another embodiment, the SAM_FND signal 310 is utilized to derive the location of the end 306 of preamble 304. Those skilled in the art will recognize that this is possible because SAM search can start after the first DFT integration window 302, with the refined phase and gain estimates from the sliding windows not being needed until the end of the Gray field 312, and the DC and ZPS based frequency estimates only being needed for the subsequent servo event. In one embodiment, the end 306 of the preamble 304 is given by:

$$t_{pre\_end} = t_{SAM} - (L_{SAM} + D_{SAM}) \times 4T$$

where $t_{sam}$ denotes the time instant that the SAM is detected, T is again the clock period of the servo baud rate, $L_{sam}$ is the number of bits in the SAM (i.e., SAM length), $D_{sam}$ is the SAM detection latency relative to a ADC output.

In another embodiment, at the end 306 of the preamble 304, all valid ZPS, ZGS, ZOS and ZPS based frequency error estimates from the sliding windows are averaged to obtain final ZPS, ZGS, ZOS and ZPS based frequency error estimates. In another embodiment, in an effort to reduce latency, each of the ZPS, ZGS, ZOS and ZPS based frequency error estimates are accumulated as they become available. As such, by the time the final estimate becomes available the system 200 merely needs to divide the accumulation results by the total number of estimates. Those skilled in the art will recognize that based on the SAM_FND latency compared to the end of preamble at ADC output, the DFT sliding windows may be over the SAM field 308 before SAM_FND is declared. In another embodiment, in order to avoid accumulating invalid estimates for ZPS, ZGS, ZOS and ZPS based frequency error, the estimates at the end of each sliding window are sent to a first-in-first-out element (FIFO) prior to being accumulated. In one embodiment, the size of the FIFO may be defined by:

$$L_{FIFO} = (L_{SAM} + D_{SAM} + 1 - D_{CALC})/2$$

where Dcalc is the calculation latency for timing, gain, and DC estimates using the DFT integration results. It is noted herein that calculation latency may differ ZPS, ZGS, ZOS and ZPS based frequency error. In another embodiment, the "+1" term in the $L_{FIFO}$ acts to end the accumulation in the second to last preamble cycle, rather than the last preamble cycle. Those skilled in the art will recognized that the last preamble cycle is commonly impacted by inter-symbol-interference from the SAM field 308, which may cause bias in the estimation results.

In one embodiment, an individual FIFO 314 is need for each of the ZPS, ZGS, ZOS and ZPS based frequency error estimates. In another embodiment, each FIFO may a different size than the other FIFOs. It is recognized herein that the size of the individual FIFOs may differ because of the difference in calculation latency for each estimate. In addition, the number of bits needed for the entries in the FIFOs to maintain the full resolution for each estimate may also differ.

In another embodiment, the outputs of the FIFOs 314 are averaged to obtain the refined estimate of the phase, gain, DC and frequency errors. In another embodiment, a counter is utilized to track the number of valid entries that have entered each of the FIFOs. It is noted herein that the number of valid entries entering the FIFOs corresponds to the total number of valid estimates obtained from the preamble.

The embodiments of system 200 illustrated in FIGS. 2A and 2B may be further configured as described herein. In addition, the system 200 may be configured to perform any other step(s) of any of the method embodiment(s) described herein.

Figure 4:
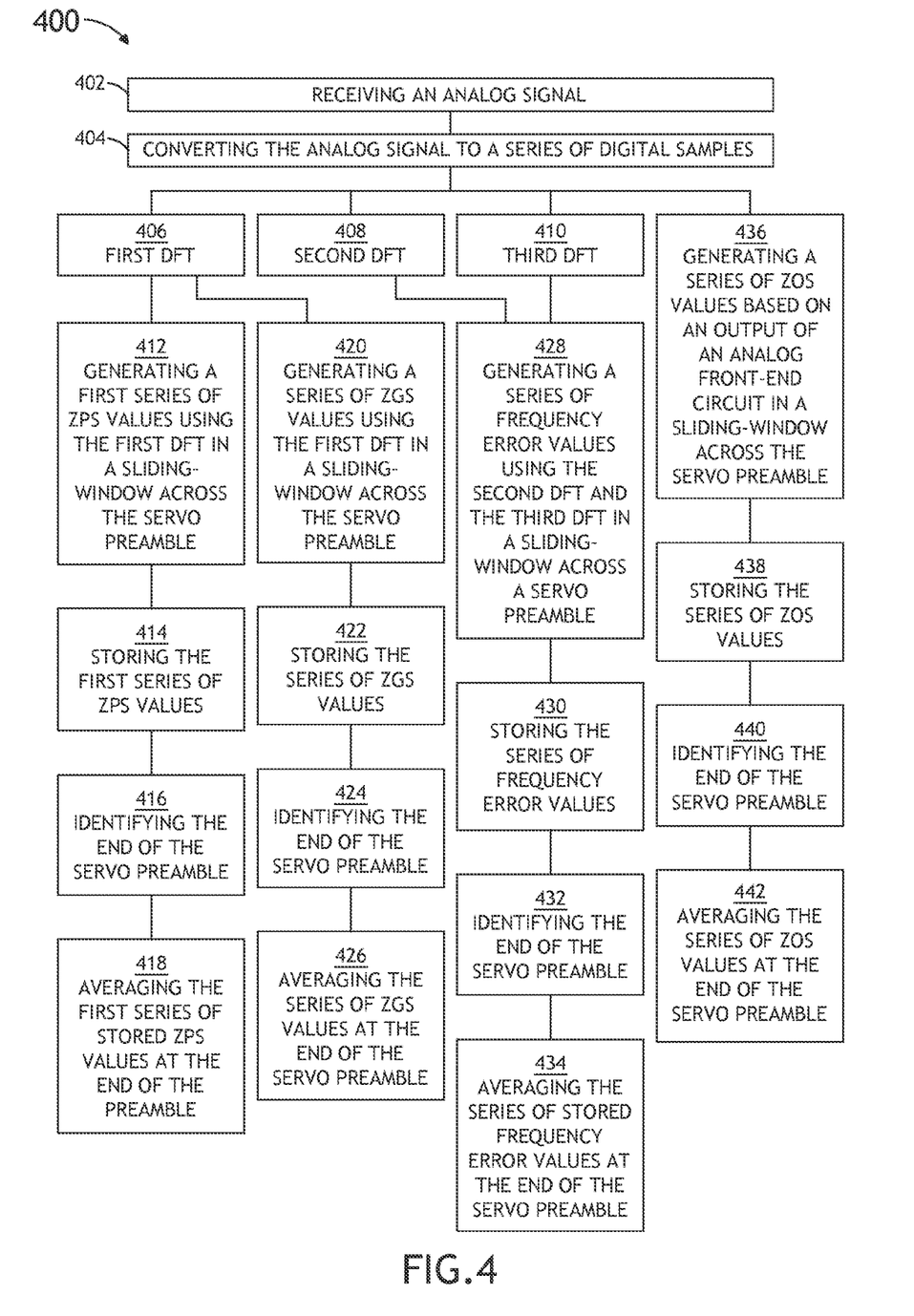
FIG. 4 illustrates a process flow 400 for data processing, in accordance with one embodiment of the present invention.

FIG. 4 illustrates a process flow 400 for data processing, in accordance with one embodiment of the present invention. In step 402, one or more analog signals are received. In one embodiment, the one or more analog signals include a repeating signal. In another embodiment, the one or more analog signals are received from a sensor suitable for sensing information stored on a storage medium (e.g., storage medium 100). In step 404, the one or more analog signals are converted to a series of digital samples synchronous to a sampling clock. In one embodiment, a variable gain amplification (VGA) is applied to the one or more received analog signals. In another embodiment, the one or more analog signals are converted to a series of digital samples using an analog-to-digital converter synchronous to a sampling clock.

In step 406, a first discrete Fourier transform (DFT) is performed on a first portion of the series of digital samples. In step 408, a second discrete Fourier transform (DFT) is performed on a second portion of the series of digital samples. In step 408, a third discrete Fourier transform (DFT) is performed on a third portion of the series of digital samples.

In step 412, a first series of zero phase start (ZPS) values is generated by calculating a zero phase start value based on the first discrete Fourier transform (step 406) in a sliding-window (e.g., sliding DFT integration window) at a series of time increments (increments of 8T) across the servo preamble. In step 414, the first series of zero phase start values for each of time increments is stored in a storage medium (e.g., internal storage register). In step 416, the end of the servo preamble is identified with a sector address mark. In one embodiment, the end of preamble is identified using a SAM_FND function. In step 418, the first series of stored zero phase start values are averaged upon reaching the end of the servo preamble in order to generate an averaged first zero phase start value. In a further step, the averaged zero phase start value is provided to a phase correction circuit (e.g., phase correction circuit 217), such as burst interpolation circuit. In another step, the averaged zero phase start value is provided to a sector address mark detection circuit (e.g., SAM detection circuit 236).

In step 420, a series of zero gain start (ZGS) values are generated based on the first discrete Fourier transform in a sliding-window at a series of time increments across the servo preamble. In step 422, the series of zero gain start values are stored for each of the time increments. In step 424, the end of the servo preamble is identified with a sector address mark. In step 426, the series of zero gain start values are averaged upon reaching the end of the servo preamble in order to generate an averaged zero gain start value. In a further step, the averaged zero gain start value is scaled in order to generate a variable gain feedback value. In another step, a variable gain of the one or more analog signals being converted to the series of digital samples is adjusted in response to the generated variable gain feedback value.

In step 428, a series of frequency error values (i.e., ZPS based frequency error values) are generated by calculating a frequency error value based on the second discrete Fourier transform and the third discrete Fourier transform in a sliding-window at a series of time increments across a servo preamble. In step 430, the series of frequency error values are stored for each the time increments. In step 432, the end of the servo preamble is identified with a sector address mark. In step 434, the series of stored frequency error values are averaged at the end of the servo preamble in order to generate an averaged frequency error value. In a further step, the averaged frequency error value is scaled in order to generate a frequency offset output. In another step, the sampling clock is adjusted in response to the generated frequency offset output.

In step 436, a series of zero offset start (ZOS) values is generated based on an output of the analog front-end circuit in a sliding-window at a series of time increments across the servo preamble. In step 438, the series of zero offset start values is stored for each of the time increments. In step 440, the end of the servo preamble is identified with a sector address mark. In step 442, the series of zero offset values is averaged at the end of the servo preamble in order to generate an averaged zero offset start value. In a further step, the averaged zero offset start value is scaled to in order to generate a D.C. offset output. In another step, the analog front-end 203 is adjusted in response to the generated D.C. offset.

Applicant notes that the above ordering of steps should not be interpreted as limiting. It is anticipated that at least a portion of the steps of process 400 may be carried out in a different order.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed:

1. A method for data processing in a servo channel comprising:
    receiving one or more analog signals, wherein the one or more analog signals include a repeating signal;
    converting the one or more analog signals to a series of digital samples synchronous to a sampling clock;
    performing a first discrete Fourier transform on a first portion of the series of digital samples;
    performing a second discrete Fourier transform on a second portion of the series of digital samples;
    performing a third discrete Fourier transform on a third portion of the series of digital samples;
    generating a first series of zero phase start values by calculating a zero phase start value based on the first discrete Fourier transform in a sliding-window at a series of time increments across a servo preamble;
    storing the first series of zero phase start values for the time increments; and
    averaging the first series of stored zero phase start values at the end of the servo preamble.

2. The method of claim 1, further comprising:
    determining a best phase start value with a zero phase start value acquired from a first integration window at a first time increment.

3. The method of claim 1, further comprising:
    performing sector address mark detection following acquisition of a zero phase start value from a first integration window at a first time increment.

4. The method of claim 1, further comprising:
    pipelining the first series of zero phase start values utilizing a first FIFO prior to averaging.

5. The method of claim 1, further comprising:
    generating a series of frequency error values by calculating a frequency error value based on the second discrete Fourier transform and the third discrete Fourier transform in a sliding-window at a series of time increments across a servo preamble;
    storing the series of frequency error values for the time increments;
    averaging the series of stored frequency error values at the end of the servo preamble in order to generate an averaged frequency error value.

6. The method of claim 5, further comprising:
    pipelining the series of frequency error values utilizing a second FIFO prior to averaging.

7. The method of claim 5, wherein the generating a series of frequency error values by calculating a frequency error value based on the second discrete Fourier transform and the third discrete Fourier transform at a series of time increments across a servo preamble comprises:
    generating a series of frequency error values by calculating a frequency error value based on a second series of zero phase start values generated from the second discrete Fourier transform and a third series of zero phase start values generated from the third discrete Fourier transform in a sliding-window at a series of time increments across a servo preamble.

8. The method of claim 5, further comprising:
    scaling the averaged frequency error value in order to generate a frequency offset output.

9. The method of claim 8, further comprising:
    adjusting the sampling clock in response to the generated frequency offset output.

10. The method of claim 1, further comprising:
    generating a series of zero gain start values based on the first discrete Fourier transform in a sliding-window at a series of time increments across the servo preamble;
    storing the series of zero gain start values for the time increments; and
    averaging the series of zero gain start values at the end of the servo preamble in order to generate an averaged zero gain start value.

11. The method of claim 10, further comprising:
    pipelining the series of zero gain start values utilizing a third FIFO prior to averaging.

12. The method of claim 10, further comprising:
    scaling the averaged zero gain start value in order to generate a variable gain feedback value.

13. The method of claim 12, further comprising:
    adjusting a variable gain of the one or more analog signals being converted to the series of digital samples in response to the generated variable gain feedback value.

14. The method of claim 1, further comprising:
    generating a series of zero offset start values based on an output of the analog front-end circuit in a sliding-window at the series of time increments across the servo preamble;
    storing the series of zero offset start values for the time increments; and
    averaging the series of zero offset values at the end of the servo preamble in order to generate an averaged zero offset start value.

15. The method of claim 14, further comprising:
    pipelining the series of zero offset start values utilizing a fourth FIFO prior to averaging.

16. The method of claim 1, further comprising:
    identifying the end of the servo preamble with a sector address mark.

17. A data processing system comprising:
    an analog front-end circuit configured to receive one or more analog signals and convert the one or more analog signals to a series of digital samples;
    one or more discrete Fourier transform circuits configured to perform a first discrete Fourier transform on a first portion of the series of digital samples, perform a second discrete Fourier transform on a second portion of the series of digital samples, perform a third discrete Fourier transform on a third portion of the series of digital samples;

a first zero phase start calculation circuit configured to generate a first series of zero phase start values by calculating a zero phase start value based on the first discrete Fourier transform in a sliding-window at a series of time increments across a servo preamble;

a frequency error calculation circuit configured to generate a series of frequency error values by calculating a frequency error value based on the second discrete Fourier transform and the third discrete Fourier transform in a sliding-window at the series of time increments across the servo preamble;

a zero gain start calculation circuit configured to generate a series of zero gain start values based on the first discrete Fourier transform in a sliding-window at the series of time increments across the servo preamble;

a zero offset start calculation circuit configured to generate a series of zero offset start values based on an output of the analog front-end circuit in a sliding-window at the series of time increments across the servo preamble;

memory configured to store at least one of the first series of zero phase start values, the series of frequency error values; the series of zero gain start values and the series of zero gain start values;

averaging circuitry configured to average at least one of the first series of stored zero phase start values at the end of the servo preamble, the series of frequency error values at the end of the servo preamble, the series of zero gain start values at the end of the servo preamble and the series of zero offset start values at the end of the servo preamble.

18. The system of claim 17, wherein the one or more discrete Fourier transform circuits comprise:

a first discrete Fourier transform circuit configured to calculate a first sine component and a first cosine component from the first portion of the series of digital samples;

a second discrete Fourier transform circuit configured to calculate a second sine component and a second cosine component from the second portion of the series of digital samples; and a third discrete Fourier transform circuit configured to calculate a third sine component and a third cosine component from the third portion of the series of digital samples.

19. The system of claim 17, wherein the memory comprises:

one or more internal working registers configured to store at least one of the first series of zero phase start values, the series of frequency error values; the series of zero gain start values and the series of zero gain start values.

20. The system of claim 17, wherein the analog front-end circuit comprises:

a variable gain amplifier configured to supply a variable gain to the received one or more analog signals; and an analog-to-digital converter configured to converted the received one or more analog signals to a series of digital samples synchronous to a sampling clock.

21. The system of claim 17, wherein the averaging circuitry comprises:

a first averaging circuit configured to average the first series of stored zero phase start values at the end of the servo preamble;

a second averaging circuit configured to average the series of zero gain start values at the end of the servo preamble;

a third averaging circuit configured to average the series of frequency error values at the end of the servo preamble; and a fourth averaging circuit configured to average the series of zero offset start values at the end of the servo preamble.

22. The system of claim 17, wherein the data processing system is implemented in an integrated circuit.

* * * * *